United States Patent
Grey et al.

[15] 3,662,900
[45] May 16, 1972

[54] RETRIEVER ATTACHMENT FOR A BALE WAGON

[72] Inventors: Donald M. Grey, Selma; Albert C. Cook, Kingsburg, both of Calif.

[73] Assignee: Sperry Rand Corporation, New Holland, Pa.

[22] Filed: July 29, 1970

[21] Appl. No.: 59,262

[52] U.S. Cl..................................214/6 B, 214/501, 294/99, 294/104
[51] Int. Cl........................................................B65g 57/32
[58] Field of Search..................214/6 B, 501, 654, 505, 506, 214/518

[56] References Cited

UNITED STATES PATENTS

| | | | |
|---|---|---|---|
| 3,401,810 | 9/1968 | Grey | 214/6 B |
| 3,572,521 | 3/1971 | Grey et al. | 214/6 B |
| 3,289,859 | 12/1966 | Tarbox | 214/6 B |
| 3,412,882 | 11/1968 | Stockwell | 214/350 X |
| 3,502,230 | 3/1970 | Grey et al. | 214/6 B |

*Primary Examiner*—Robert J. Spar
*Attorney*—Joseph A. Brown, John C. Thompson, James J. Kennedy and George C. Bower

[57] ABSTRACT

A retriever clamping device for attachment onto a bale wagon for providing the same with the additional capability of retrieving load stacks. The clamping device is generally T-shaped and includes an elongated beam having a cross bar attached thereto about the upper portions and extending laterally thereacross. A series of spaced apart tines are disposed on the cross bar and extend rearwardly for engagement with the top tier of the load stack to be retrieved. The T-shaped clamping device is pivotally mounted transversely the forward end of a load table by securing a mounting bar that is affixed to the clamp within mounted brackets extending from the load table. The clamp is actuated by a remotely controlled hydraulic cylinder whose piston is connected to the lower portion of the elongated beam.

8 Claims, 3 Drawing Figures

INVENTOR
ALBERT COOK
DONALD M. GREY

Patented May 16, 1972

INVENTOR.
ALBERT COOK
DONALD M. GREY

RETRIEVER ATTACHMENT FOR A BALE WAGON

BACKGROUND OF THE INVENTION

This invention relates to bale retrieving devices and more particularly to a clamping device for attachment onto a bale wagon load table for retrieving stacks of bales.

The bale wagon shown in the U.S. Pat. to Grey No. 2,848,127 has enjoyed substantial commercial success. This bale wagon consists of a first table or pick-up table, a second table or transfer table, and a third table also known as a load rack, load bed, or a load table. These machines will pick up individual bales from a field and form them into a stack of bales on the load bed. The stack can then be placed on the ground by swinging the load table about a transverse axis to place the rearmost tier of bales upon the ground, and then by moving the wagon away from the stack of bales resting upon the ground. It is sometimes desirable to also retrieve the stack of bales and in the past bale wagons employing the three table concept have achieved stack retrieving capability by pivotally mounting the intermediate or second table to the front of the load rack or third table frame. Used as such the second table serves the dual function of loading the load rack and clamping the stack about the load rack during retrieving operations. This has not been completely satisfactory because the mass associated with the second table requires greater power to lift the load rack besides demanding a heavy duty load rack frame. Also in many bale wagons the second table performs supplementary functions such as single bale unloading and automatic tieing. The circuitry associated with the mechanisms for performing these functions must be routed to the rear of the wagon chassis, up the by pivot point of the load rack, and back under the load rack table to the front of the frame. This proves to be inconvenient, difficult to service and quite expensive.

While in the stacked position the weight of the load itself acts downwardly tending to compress the load stack. As the load stack is gripped at the bottom by the cooperating load rack fingers and at the top by the front clamping means and is brought from the vertical stacked position to the horizontal transporting position the load stack naturally expands, resulting in an outward force on both the fingers and the front clamp. Since the second table is normally rigid and nonflexible this force is transmitted in the form of a back pressure to the hydraulic system controlling the clamp. This significantly increases the chances of failures within the linkage network and the hydraulic system.

It is an object of the present invention to provide a retriever clamp attachment for a bale wagon of the type having a chassis, a first table, a second table and a load rack table tandemly arranged, the tables all being mounted directly on the wagon chassis. The retriever clamp attachment is mounted transversely on the front portion of the load rack whereby said load rack may be used to retrieve stacks.

Another object of the present invention is to provide a remotely controlled hydraulic cylinder for mounting about the load rack to operatively connect with the retriever clamp for selectively engaging and disengaging the clamp with the load stack.

A further object of the present invention is to provide a novel clamp structure that is flexible for withstanding the varying loads placed thereagainst as the load stack is shifted from the stacked position to the transporting position and visa versa.

Another object of the present invention is to provide flexibility in a retriever clamp by having a generally T-shaped clamping device whose longitudinal member includes first and second sectional members pivotally secured together in end to end relationship and wherein a biasing means in the form of a leaf spring is secured to the inner end of one of said sectional members and extends over to other said sectional member for engagement therewith.

A further object of the present invention is to provide the longitudinal member of the clamping device with a telescopical feature for adjusting the length thereof to accommodate different size stack loads resulting from varying size bales.

Other objects and advantages of the present invention will become apparent from a study of the following description and the accompanying drawings which are merely illustrative of the present invention.

Figure 1:
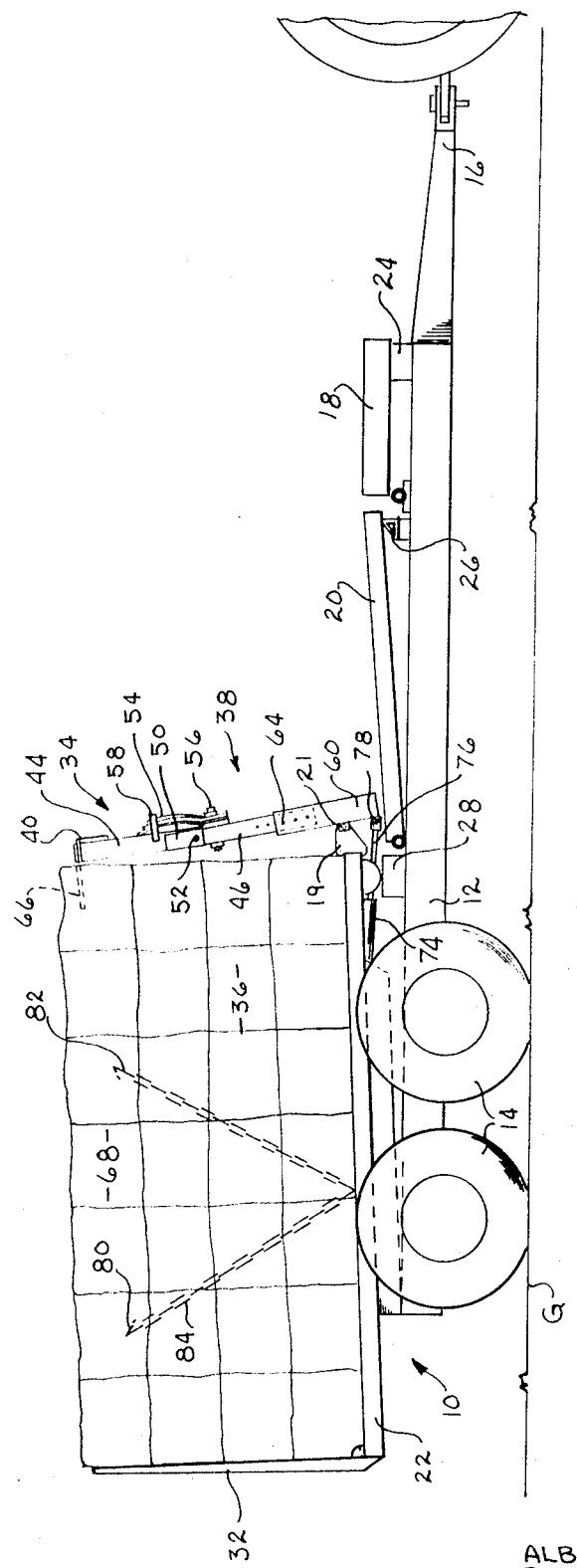
FIG. 1 is a side elevational view of a three table bale wagon with the clamping attachment disposed forwardly on the load rack and engaged with a load stack for transporting.

With reference to the drawings, particularly FIG. 1, a bale wagon of the type shown in the Grey U.S. Pat. No. 2,848,127 is indicated generally at 10 having a chassis 12 mounted by wheels 14. Extending forwardly from the chassis 12 is a tongue 16 for coupling the wagon 10 with a pulling means. Tandemly arranged longitudinally on the chassis 12 is a first receiving table 18, a second transfer table 20 and a third load carrying table or load rack 22. Each of the tables are mounted on the chassis 12 independently of each other for pivotal movement about a transverse axis extending generally across the rear end thereof. Three cross member stops 24, 26 and 28 are fixed to the chassis 12 and extends transversely thereacross for supporting the front ends of tables 18, 20 and 22 respectfully. Retaining means in the form of a series of spaced apart fingers 32 are fixed to the rear end of the load rack 22 and extend generally normal therefrom.

Figures 2, 3:
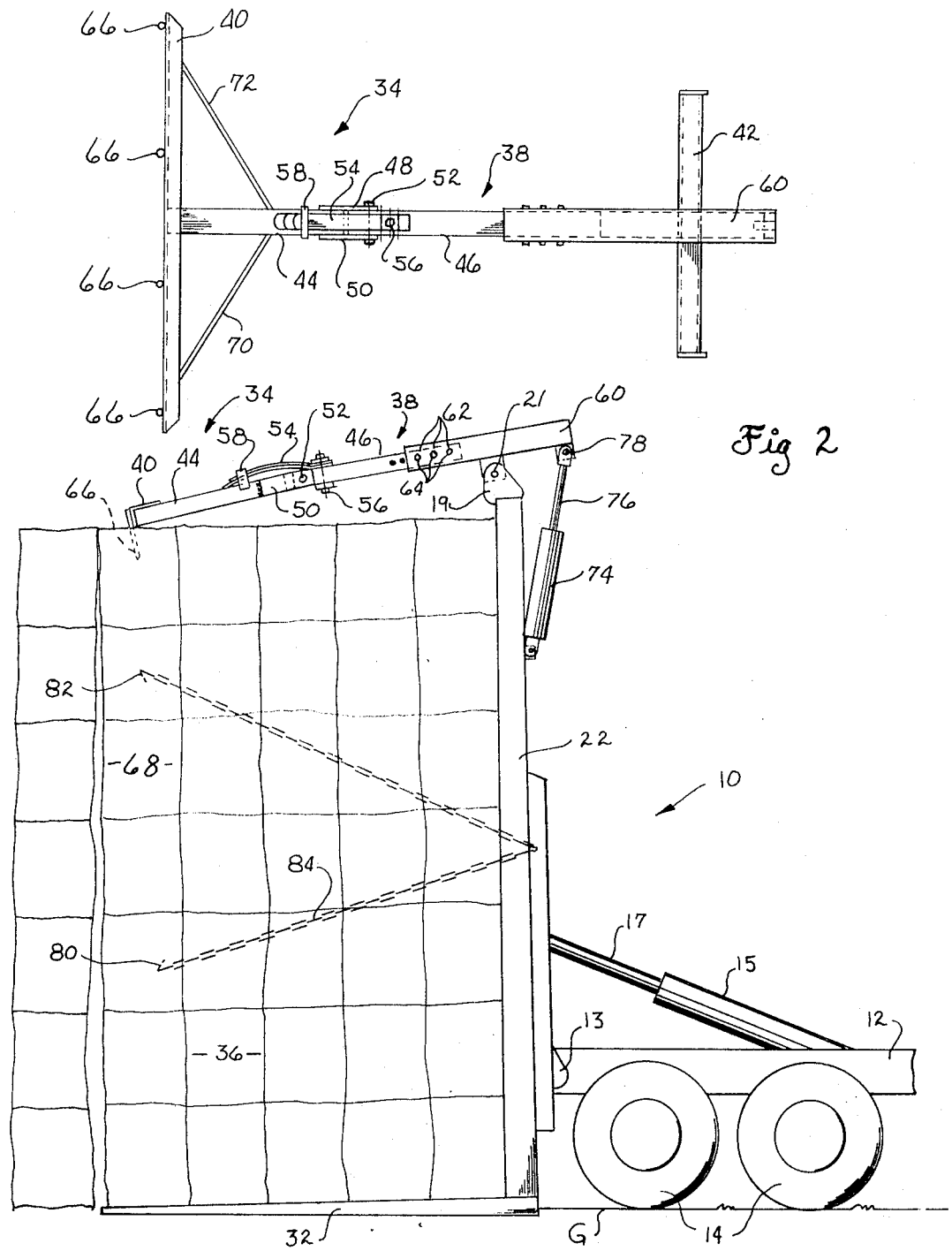
FIG. 2 is a plan view of the retriever clamping attachment.
FIG. 3 is a side elevational view of the retriever clamping attachment and the rear portion of a bale wagon showing especially the manner of mounting the retriever clamp onto the load table of the bale wagon.

Still referring to FIG. T-shaped. a retriever clamp attachment 34 is mounted transversely the front end of load rack 22 and is shown engaged with load stack 36 resting in the transporting horizontal position. Turning to FIG. 2, a detailed plan view of the clamp 34, it can be seen that the main body of the clamp is generally T-shaed. The back or support of the clamp 34 is an elongated longitudinal beam assembly 38 having a cross member 40 affixed to the upper portion thereof and extending transversely thereacross. Fastened to the lower portion of the beam assembly 38 is a mounting bar 42 also extending transversely thereacross generally parallel to cross member 40.

Beam member 38 includes an upper sectional member 44 and a lower sectional member 46 pivotally secured together in end to end relationship by a pair of pivot arms 48,50. The pivot arms 48,50 are affixed at one end to outer opposite sides of the upper sectional member 44 by welds or other suitable means and extend generally parallel therefrom to where they are pivotally secured at the other end to opposite sides of the lower sectional member 46 by a pivot pin 52 which extends transversely through the upper end portion of lower sectional member 46.

Bridgedly extending across the inner ends of the upper and lower sectional members 44,46 is a biasing means in the form of a leaf spring 54. Secured to the lower sectional member 46 by a bolt assembly 56 the spring 54 bows across the axis of the pivot pin 52 for engagement with the upper sectional member 44. Upper sectional member 44 is held closely adjacent the leaf spring 54 by a C clamp 58 which is affixed to the former and encompasses the forward end of the latter.

The lower end of the lower sectional member 46 is telescopically received within the upper end of a base section 60. Both the base section 60 and the lower sectional member 46 have a corresponding series of longitudinally spaced apertures 62 about their common joining area. Thus the length of beam assembly 38 may be adjusted to accomodate various size load stacks by sliding the lower sectional member 46 either upwardly or downwardly until the desired length is reached and the apertures 62 of both the base section 60 and the lower sectional member 46 are properly aligned, whereby fixing pins 64 are inserted therethrough.

The cross member 40 which extends laterally across the upper end of beam member 38 includes a plurality of spaced apart engagement elements or tines 66 which extend outwardly and rearwardly therefrom for engagement with the outwardly disposed bales of the top layer 68. Support is afforded the cross member 40 by a pair of braces 70,72 which are affixed near the outer ends of the cross member 40 and extend to points just above the leaf spring 54 where they are joined to opposite sides of the upper sectional member 44.

With reference to FIG. 3 the load rack 22 is pivoted about the rear of chassis 12 by a pair of brackets 13, of which only one is shown. Power is supplied for pivotally moving the load rack 22 between the normal horizontal transporting position and the vertical stacking or retrieving position by a remotely controlled hydraulic load cylinder 15 and its associated piston 17. The cylinder 15 is fixed within the chassis 12 and the piston 17 extends rearwardly therefrom for connection with the underside of load rack 22.

To provide the load rack 22 with mounting means for receiving the retriever clamp 34, a mounting bracket 19 is attached to each side of the load rack 22 about the forward end thereof. The brackets 19 are properly aligned and spaced apart for receiving the mounting bar 42 therebetween. When the clamp 34 is so mounted pivot pins 21 extend through the brackets 19 into the ends of the mounting bar 42 for pivotally securing the later transversely the front end of load rack 22.

Engagement and disengagement of the retriever clamp 34 with the load stack 36 is remotely controlled by a double acting hydraulic cylinder 74 and its associated piston 76. The anchor end of the cylinder 74 is pivotally secured generally midway the front of the underside of the load rack 22 and extends forwardly and slightly downwardly therefrom. The rod end of piston 76 is connected to the lower end of base section 60 at junction 78. Thus by selectively actuating the double acting hydraulic cylinder 74 the retriever clamp will pivot about the longitudinal axis of mounting bar 42 either clockwise for disengagement or counterclockwise for engagement with the load stack 36.

To retrieve a load stack, the clamp 34 is mounted to the front end of load rack 22. The wagon 10 is positioned just ahead of the load stack 36 at which time the load rack is tilted rearwardly until the fingers 32 are situated generally parallel and adjacent to ground G. Hydraulic cylinder 74 is actuated to disengage or open the retriever clamp 34. The wagon is then propelled rearwardly wedging the fingers 32 beneath the load stack 36. (FIG. 3) At this time the retrieving clamp 34 is actuated to engage the load stack 36. The tines 66 extending from the cross member 40 penetrates the upper bales of the top tier for positive engagement with the load stack. The force exerted on the clamp 34 by the cylinder 74 causes the top layer of bales to be compressly held between the fingers 32 and the clamp thereby enclosing the entire load stack for retrieving.

To assure that the load does not buckle when the load stack 36 is brought forward to the horizontal transporting position, a pair of spikes 80,82 are secured within the top layer on each side of the load and connected to a point generally midway the load rack 22 by a chain 84. This spike and chain assembly is not considered a necessity for retrieving, but serves only to safeguard that the load will not be spilled.

After the load stack is firmly gripped by the clamp 34 and fingers 32, the load rack 22 is brought forward to the horizontal transporting position. In so doing the load may tend to expand longitudinally, in which case the upper portion of the spring biased clamp can flex forwardly. When restacking the retrieved load the load rack 22 is tilted rearwardly to where the fingers 32 lie generally parallel and adjacent to ground G. To prevent the stack from spilling forwardly the load rack 22 is tilted still further rearwardly, thereby placing a lean in the face of the stack. In this particular phase of restacking excessive forces directed against the retriever clamp 34 are absorbed by the leaf spring 54. Without the incorporation of the leaf spring 54 or similar device into the structure of the clamp 34, a relief valve would be required in the hydraulic circuitry to prevent failure within the clamp structure or hydraulic system from the excessive forces directed against the clamp. As a practical matter the leaf spring offers the advantage of being less expensive and easier to maintain than a relief valve.

It is obvious that the retriever clamp of the present invention has the advantage of being inexpensive to construct and can be readily mounted onto a three table type bale wagon as previously described. Although the attachment and disattachment of the retriever clamp does require time and effort on the part of the operator, its employment permits the manufacture of a less expensive bale wagon that performs three basic bale handling functions — loading, stacking and retrieving.

The terms "upper," "lower," "forward," "rearward" etc. have been used herein merely for the convenience of the foregoing specification and in the appended claims to describe the retriever clamp attachment and its parts as oriented in the drawings. It is to be understood, however, that these terms are in no way limiting to the invention since the retriever attachment may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. In a bale wagon having a wheel mounted chassis adapted to be propelled forwardly over a field, a first receiving table pivotally mounted on said chassis, a second transfer table pivotally mounted on said chassis, and a third load carrying table pivotally mounted on said chassis, said tables being tandemly arranged whereby said first and second tables cooperate to form a load stack on said third table and wherein said third table includes upstanding retaining means about the rear thereof and is pivotally moveable from a generally horizontal loading position to a position generally normal with respect to said chassis for stacking said load stack, the improvement comprising retriever means mounted on said third table for engagement and disengagement with the upper portion of said load stack, and biasing means for selectively maintaining said retriever means in engagement with an end portion of the stack opposite said retaining means, whereby said third table may additionally be employed to retrieve load stacks by tilting said third table, positioning said retaining means beneath said load stack and engaging said retriever means with the upper portion of said load stack.

2. A bale wagon, as recited in claim 1 wherein said retriever means is pivotally mounted to the front portion of said third table and wherein said retriever means is actuated into and out of engagement with said load stack by a remotely controlled hydraulic cylinder extending from said third table and operatively connected to said retriever means.

3. A bale wagon as recited in claim 2 wherein said retriever means includes a clamp structure having an elongated body member with a cross bar mounted transversely about the upper portion thereof, said cross bar having a plurality of engaging elements extending therefrom toward the rear of said third table for positive engagement with said load stack.

4. A bale wagon for loading individual bales of hay onto a load table to form a load stack, stacking the load in a selected stacking area, and retrieving the same load stacks, comprising the combination of:

a wheel mounted chassis structure;
a first receiving table, a second transfer table, and a third load carrying table having retaining means disposed about the rear thereof, said tables being tandemly arranged and each of said tables being pivotally mounted transversely on said chassis;
a detachable retriever clamp pivotally mounted transversely on the forward portion of said third table; and a remotely controlled hydraulic cylinder extending from said third table operatively connected to said retriever clamp for actuating the same into and out of engagement with said load stack.

5. A bale wagon as recited in claim 4 wherein said retriever clamp includes an elongated beam member having a cross bar fixed about the upper portion thereof and extending laterally thereacross, said cross are includes a plurality of engaging elements extending therefrom toward the rear of said third table for positive engagement with said load stack during retrieving.

6. A bale wagon as recited in claim 5, wherein said beam includes a first upper sectional member and a second lower sectional member pivotally secured together in end to end relationship and wherein a biasing means is secured to the inner end of one of said sectional members and extends over for engagement with other said sectional member.

7. A bale wagon as recited in claim 6 wherein said elongated beam is telescopical for adjusting the length thereof.

8. A bale wagon as recited in claim 6 wherein said biasing means includes a leaf spring extending across the inner ends of said first and second sectional member.

* * * * *